(12) United States Patent
Wang et al.

(10) Patent No.: US 8,330,801 B2
(45) Date of Patent: Dec. 11, 2012

(54) COMPLEXITY-ADAPTIVE 2D-TO-3D VIDEO SEQUENCE CONVERSION

(75) Inventors: Haohong Wang, San Jose, CA (US); Hsiang-Tsun Li, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1543 days.

(21) Appl. No.: 11/615,393

(22) Filed: Dec. 22, 2006

(65) Prior Publication Data

US 2008/0150945 A1    Jun. 26, 2008

(51) Int. Cl.
*H04N 13/02*    (2006.01)

(52) U.S. Cl. ............ 348/46; 348/43; 348/51; 345/419; 345/427

(58) Field of Classification Search .................. 348/43, 348/46, 51; 345/419, 427, 473; 382/186
See application file for complete search history.

(56) References Cited

U.S. PATENT DOCUMENTS

| | | | |
|---|---|---|---|
| 6,377,625 B1 * | 4/2002 | Kim | 348/43 |
| 6,553,184 B1 * | 4/2003 | Ando et al. | 386/232 |
| 6,590,573 B1 * | 7/2003 | Geshwind | 345/419 |
| 7,116,324 B2 * | 10/2006 | Kaye et al. | 345/419 |
| 7,161,614 B1 * | 1/2007 | Yamashita et al. | 348/46 |
| 7,616,885 B2 * | 11/2009 | Chen et al. | 348/42 |
| 7,729,541 B2 * | 6/2010 | Razdan et al. | 382/186 |
| 2002/0191841 A1 | 12/2002 | Harman | |
| 2003/0228034 A1 | 12/2003 | Fox et al. | |
| 2004/0212612 A1 | 10/2004 | Epstein et al. | |
| 2005/0129316 A1 * | 6/2005 | Curti et al. | 382/224 |
| 2005/0146521 A1 * | 7/2005 | Kaye et al. | 345/419 |
| 2007/0024514 A1 * | 2/2007 | Phillips et al. | 343/744 |
| 2007/0024614 A1 * | 2/2007 | Tam et al. | 345/419 |
| 2007/0279415 A1 * | 12/2007 | Sullivan et al. | 345/427 |
| 2008/0303894 A1 * | 12/2008 | Ernst et al. | 348/43 |
| 2011/0141237 A1 * | 6/2011 | Cheng et al. | 348/46 |

FOREIGN PATENT DOCUMENTS

| | | |
|---|---|---|
| JP | 2001320731 A | 11/2001 |
| JP | 2004280388 A | 10/2004 |
| JP | 2005151534 A | 6/2005 |
| WO | 9621171 | 7/1996 |

OTHER PUBLICATIONS

International Search Report, PCT/US07/088758, International Search Authority, European Patent Office, May 16, 2008.
Written Opinion, PCT/US07/088758, International Search Authority, European Patent Office, May 16, 2008.

(Continued)

*Primary Examiner* — Ramy M Osman
(74) *Attorney, Agent, or Firm* — Brent A. Boyd

(57) ABSTRACT

Techniques for complexity-adaptive and automatic two-dimensional (2D) to three-dimensional (3D) image and video conversion which classifies a frame of a 2D input into one of a flat image class and a non-flat image class are described. The flat image class frame is directly converted into 3D stereo for display. The frame that is classified as a non-flat image class is further processed automatically and adaptively, based on complexity, to create a depth map estimate. Thereafter, the non-flat image class frame is converted into a 3D stereo image using the depth map estimate or an adjusted depth map. The adjusted depth map is processed based on the complexity.

30 Claims, 11 Drawing Sheets

OTHER PUBLICATIONS

Harman et al., "Rapid 2D to 3D Conversion," Proceedings of the SPIE, Jan. 21, 2002, pp. 78-86, vol. 4660, SPIE, Bellingham, VA, USA, XP008021652.

Taiwan Search Report—TW096149812—TIPO—Apr. 21, 2011.

K. Motokawa, Physiology of color and pattern vision, Springer-Verlag, 1970.

"Applications and requirements for 3DAV", ISO/IEC JTC1/SC29/WG11, Awaji, Japan, Doc. N5416, 2002.

M. Kim, S. Park, and Y. Cho, "Object-based stereoscopic conversion of MPEG-4 encoded data", K. Aizawa, Y. Nakamura, and S. Satoh (Eds): PCM 2004, LNCS 3333, pp. 491-498, Springer-Verlag, 2004.

P. Kozankiewicz, "Fast algorithm for creating image-based stereo images", in Proc. 10th International Conference in Central Europe on Computer Graphics, Visualization and Computer Vision, Plzen-Bory, Czech Republic, 2002.

\* cited by examiner

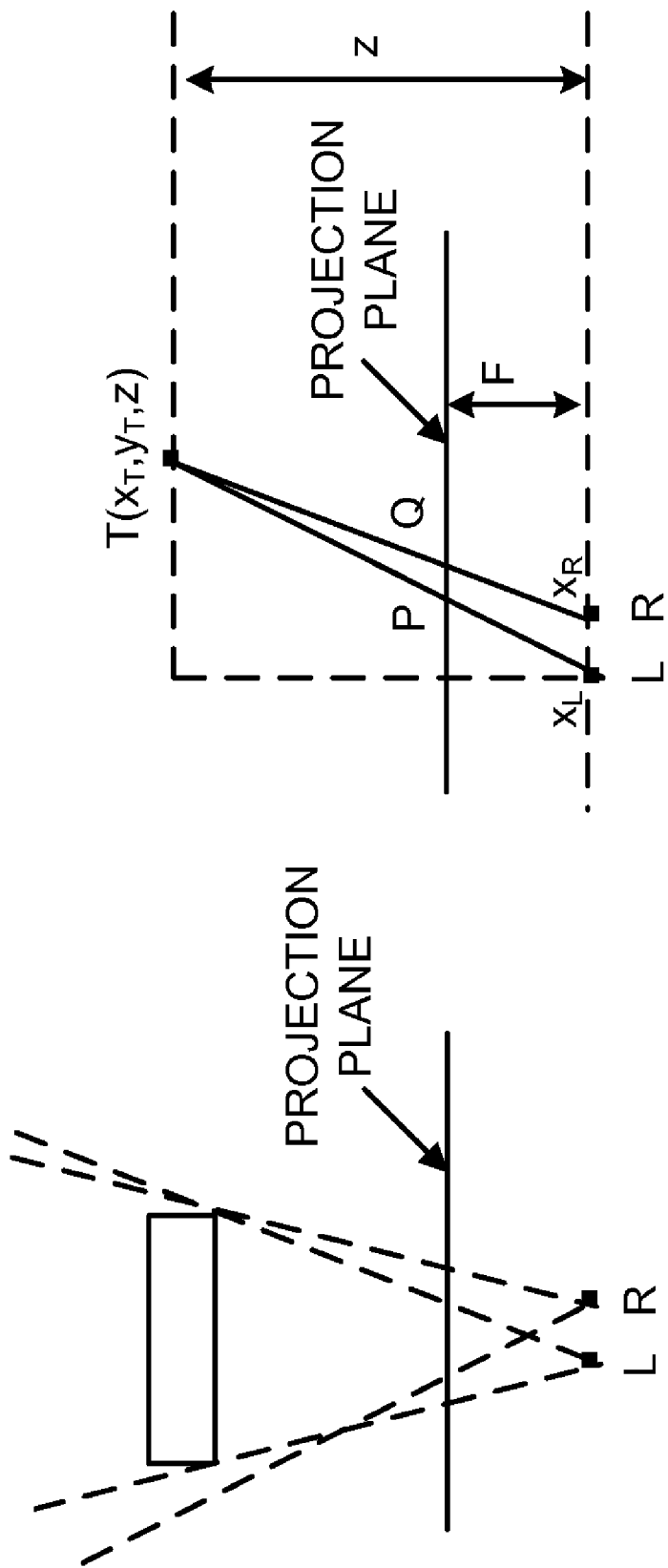

COMPLEXITY-ADAPTIVE 2D-TO-3D VIDEO SEQUENCE CONVERSION

BACKGROUND

I. Field

The present disclosure relates generally to stereoscopic video technology, and more specifically to techniques for complexity-adaptive 2D-to-3D image and video conversion.

II. Background

The development of stereoscopic video technology enables the three-dimensional (3D) perception of realistic scenes via the binocular disparity between left and right views. This mimics the human vision system that can obtain two separate views seen by our left and right eyes. Stereoscopic video technology is based on an assumption that a significant portion of the human brain is solely dedicated to the processing of binocular information. In other words, these stereo systems take advantage of the capability of our brains to measure the disparity of views and gauge the relative distances of the objects in the scene from the observer.

Currently, tremendous efforts are made in developing approaches for capturing, processing, compressing, transmitting, and displaying of stereo videos. Some other efforts are made in standardizing these technologies. However, most of the current multimedia devices deployed are implemented within the monoscopic infrastructure, and most of the videos created and sold in the market are two-dimensional (2D) movies. Therefore the 2D-to-3D video conversion techniques are expected to expand the 3D media consumer market.

Recently, there has been some attempts in converting images from 2D to 3D. In one approach, a real time method computes the depth of a number of separated areas of the 2D images from their contrast, sharpness and chrominance, and from the motion information. Thereafter, conversion is conducted based on the obtained depth information. In another approach, a facial feature based parametric depth map generation scheme converts 2D head-and-shoulder images to 3D. Similarly in a still further approach, both kinematics and 3D human walking motion models are used as sources of prior knowledge to estimate 3D gait of the monocular image sequences.

In another attempt to convert images from 2D to 3D, the depth maps are extracted based on a mixed set of automatic and manual technologies, where a manual processing is called when the automatic data correlation analysis fails. In a still further attempt, an unsupervised method for depth-map generation was proposed, however, some steps in the approach, for example the image classification in preprocessing, are not trivial and may be very complicated to implement. Accordingly, implementation would not be practical. In a still further attempt, a real-time 2D to 3D image conversion algorithm uses motion detection and region segmentation; however, the artifacts are not avoidable due to the inaccuracy of object segmentation and object depth estimation. Segmented objects are used to avoid the object segmentation artifacts.

In a still further approach to convert images from 2D to 3D, the camera motion analysis is conducted on the motion vector data of VOPs (Video Object Planes) and the objects are horizontally shifted differently according to the camera motion type. In a still further approach, the typical SfM (Structure from Motion) methods, for example extended Kalman filters, are extended to the object-level processing. In a still further approach, a new on-line ICA mixture model is used for image segmentation, and then the system goes through depth estimated and pixel shifting algorithm to generate a 3D-effect image.

As can be readily seen, the existing approaches for 2D-to-3D image and/or video conversion are not complexity-adaptive. Furthermore, the known approaches for 2D-to-3D image and/or video conversion are not generic for both real-time and offline 2D-to-3D video conversion or used to enhance the 3D effect of some previous recorded 2D movies.

There is therefore a need in the art for techniques for complexity-adaptive 2D-to-3D image and video conversion.

SUMMARY

Techniques for complexity-adaptive 2D-to-3D image and video conversion are described herein. In an embodiment, an apparatus includes an image classification module operable to classify a frame of a two-dimensional (2D) input into a first image class or a second image class. The apparatus also includes an image depth-map estimation module operable to process automatically and adaptively, based on complexity, those frames classified as the second image class to create a depth map estimate. A 3D image pair generator module is provided which is operable to convert into a 3D stereo image directly those frames classified as the first image class and, using the depth map estimate, those frames classified as the second image class.

In another aspect, a method comprises analyzing a 2D input, and classifying a frame of the 2D input into a class selected from flat image class and a non-flat image class. The frames classified as the non-flat image class are processed automatically and adaptively, based on complexity, to create a depth map estimate. The frames classified as the flat image class are converted directly into a 3D stereo image. After the processing step, the frames classified as the non-flat image class are converted into a 3D stereo image.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 10A illustrates left and right view of binocular vision.

FIG. 10B illustrates a geometry model of binocular vision which parameters for calculating the disparity map.

DETAILED DESCRIPTION

Embodiments of the 3D stereoscopic imaging apparatus are described below with a specific application to the conversion of two-dimensional (2D) images of video sequences into 3D stereoscopic video sequences. However, it will be appreciated by those of ordinary skill in the art that the present invention is also well adapted for other types of 2D images in both real-time and offline requiring conversion to 3D. The embodiments are also adapted for images processed in the YUV or red, green blue (RGB) format as well as to enhance the 3D effect of some previously recorded 2D movies. The 2D images may include monoscopic images captured by a single-sensor camera sensor.

Figure 1:
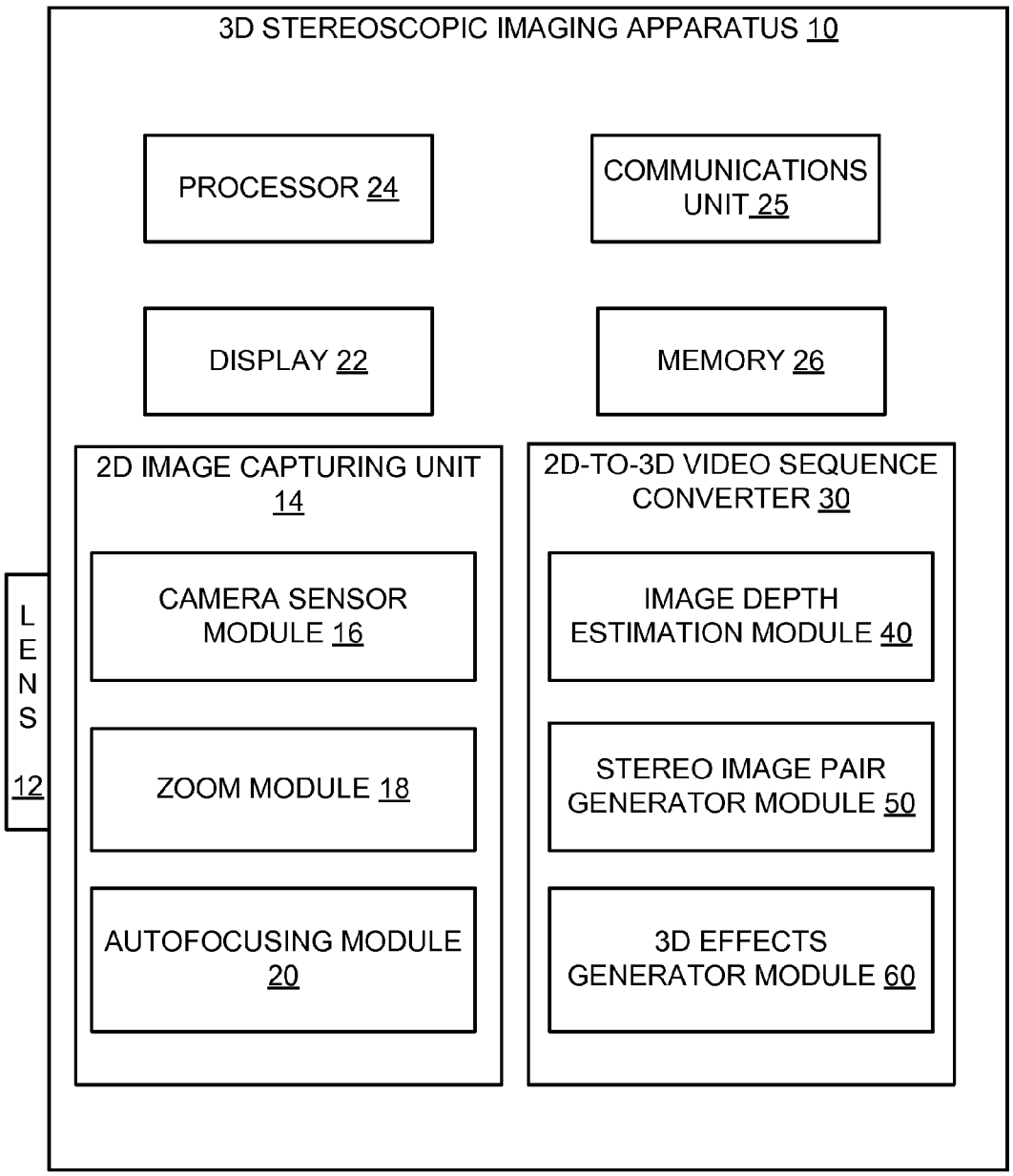
FIG. 1 illustrates a block diagram of a 3D stereoscopic imaging apparatus.

Referring now to FIG. 1, a 3D stereoscopic imaging apparatus, generally designated at 10, is shown. The 3D stereoscopic imaging apparatus 10 includes, in general, a processor 24 to control the operation of the apparatus 10 described herein, a lens 12, a two-dimensional (2D) image capturing unit 14 and 2D-to-3D video sequence converter 30. The processor 24 executes program instructions or programming code stored in memory 26 to carryout the operations described herein. The 2D image capturing unit 14 includes a camera sensor module 16, a zoom module 18 and an autofocusing module 20. The zoom functions and autofocusing functions of cameras, camcorders, and other video imaging devices (e.g., mobile phones with video capability) are well established and require no further explanation. The apparatus 10 further includes a communication unit 25 for communicating with wired or wireless communications networks or devices. Accordingly, the apparatus 10 is suited for mobile, cellular, satellite, wireless communication devices or other telephones with video capability. The apparatus 10 may include other hand-held or portable devices such as laptops, Tablet PCs, Notebooks, etc. with video capability.

Figure 3:
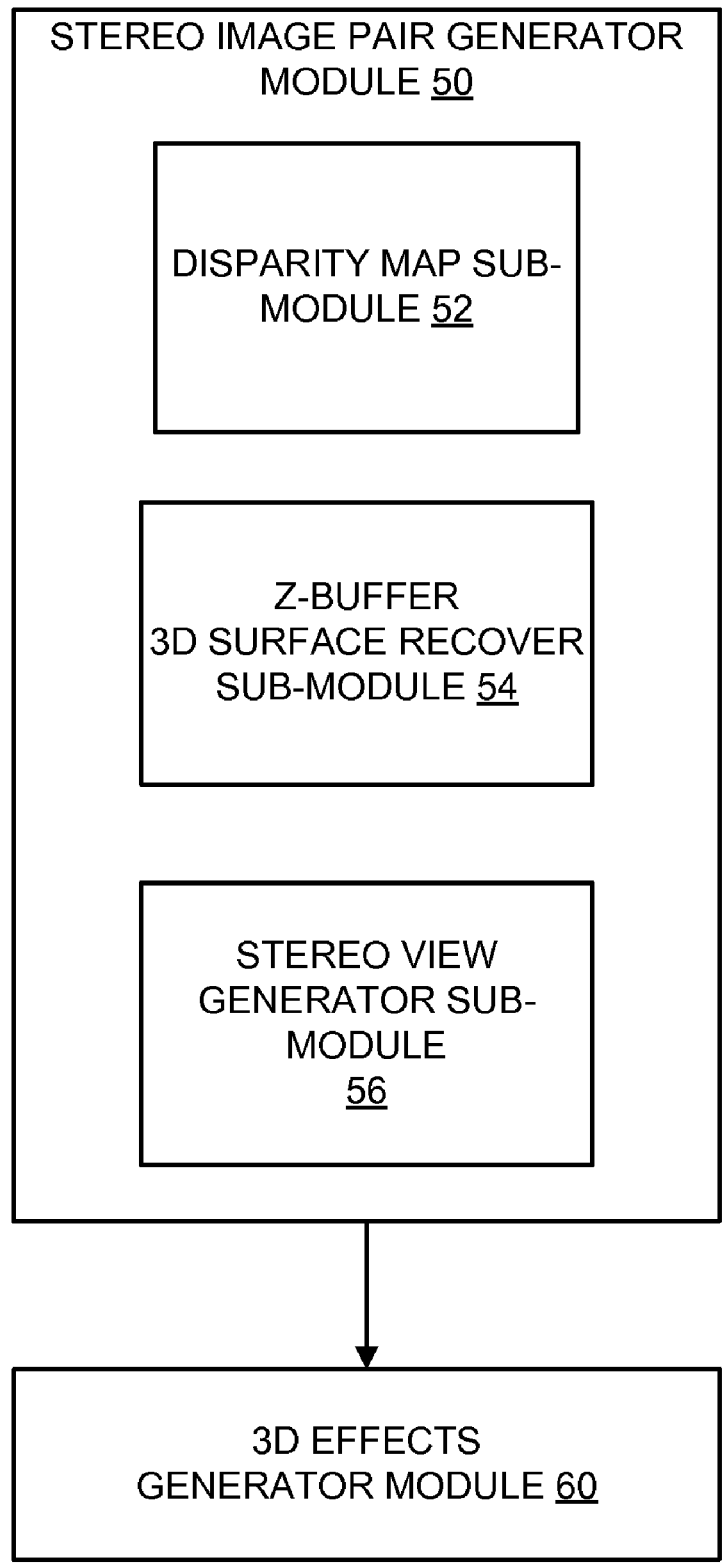
FIG. 3 illustrates a block diagram of a stereo image pair generator module.

The camera sensor module 16 is a single-sensor camera sensor module which captures a monoscopic image or video sequence using the zoom module 18 and/or the autofocusing module 20. For illustrative purposes, because only one image is captured, such image is used to represent a Left (L) view for the stereo imaging and displaying on a display 22. A stereo image pair generator module 50 is included in the 2D-to-3D video sequence converter 30 to generate a second or missing Right (R) view in the stereo image pair generator module 50 from the Left view (original captured image) and an image depth map. As best seen in FIG. 3, the stereo image pair generator module 50 comprises, in general, a disparity map sub-module 52, a Z-buffer 3D surface recover sub-module 54, and a stereo view generator sub-module 56.

The 2D-to-3D video sequence converter 30 further includes an image depth estimation module 40 and a 3D effects generator module 60. The output of the stereo image pair generator module 50 outputs the left and right views which are further processed by a 3D effects generator module 60. In the exemplary embodiment, the 3D effects generator module 60 is an inexpensive red-blue anaglyph to demonstrate the resulting 3D effect. The generated stereo views are feasibly displayed by other mechanisms such as holographic and stereoscopic devices.

Figure 2:
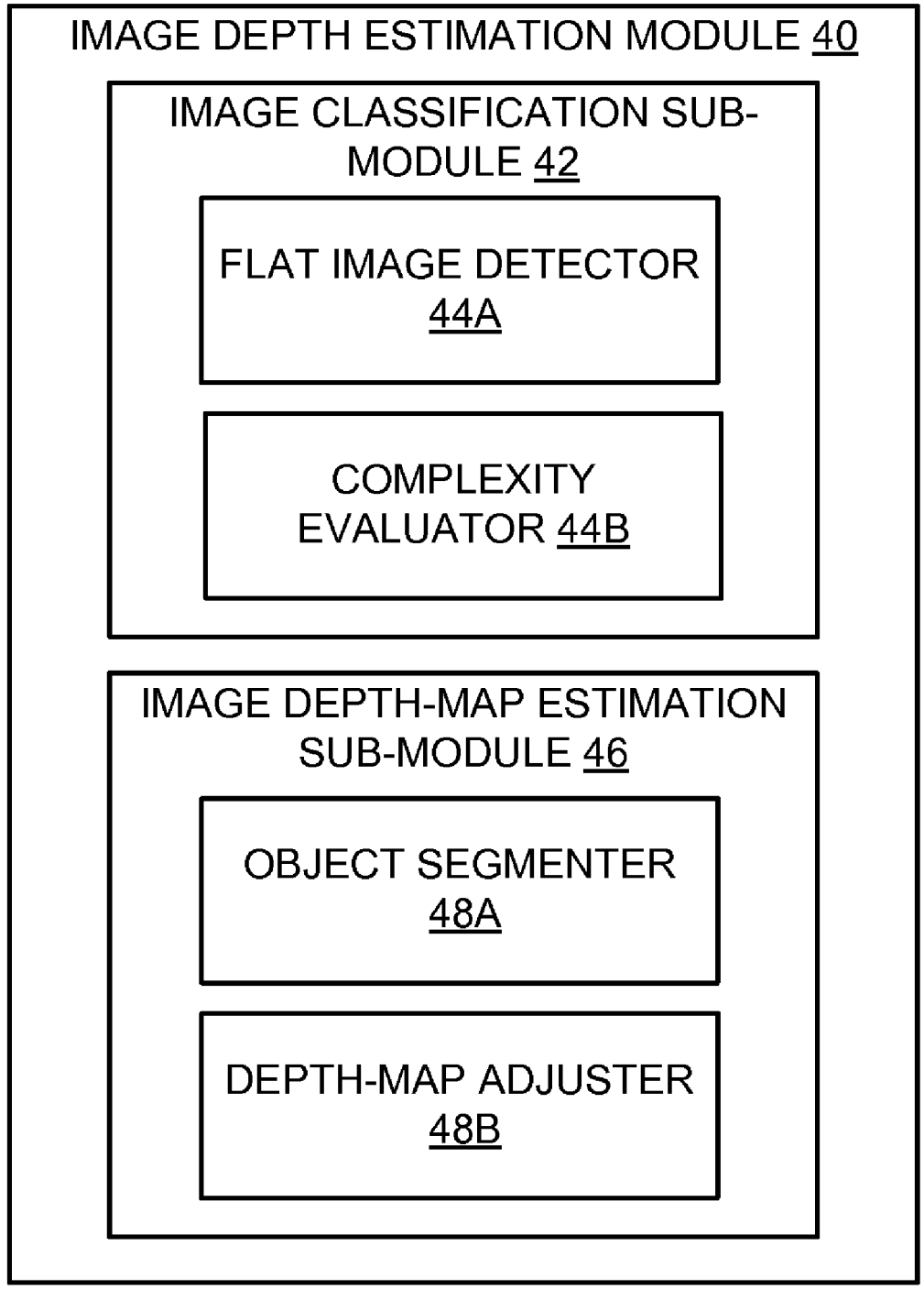
FIG. 2 illustrates a block diagram of an image depth estimation module.

Referring now to FIG. 2, a block diagram of the image depth estimation module 40 is shown. The image depth estimation module 40 includes an image classification sub-module 42 and an image depth-map estimation sub-module 46. The image classification sub-module 42 has a flat image detector 44A to classify an image into flat or non-flat types to reduce the computational complexity for processing a flat image, and help to reduce possible outliers in the image depth-map generation performed by the image depth-map estimation sub-module 46. The image classification sub-module 42 further includes a complexity evaluator 44B to adaptively adjust the estimation accuracy when suitable. The complexity is adaptive in the sense that the conversion process can be simplified to trade estimation accuracy with processing speed.

The image depth-map estimation sub-module 46 includes an object segmenter 48A which uses a rule-based approach for object segmentation to help adjust the depth of pixels belonging to the same object. The image depth-map estimation sub-module 46 also uses temporal depth smoothing to avoid the visual discomfort caused by segmentation errors by a depth-map adjuster 48B.

Figure 4:
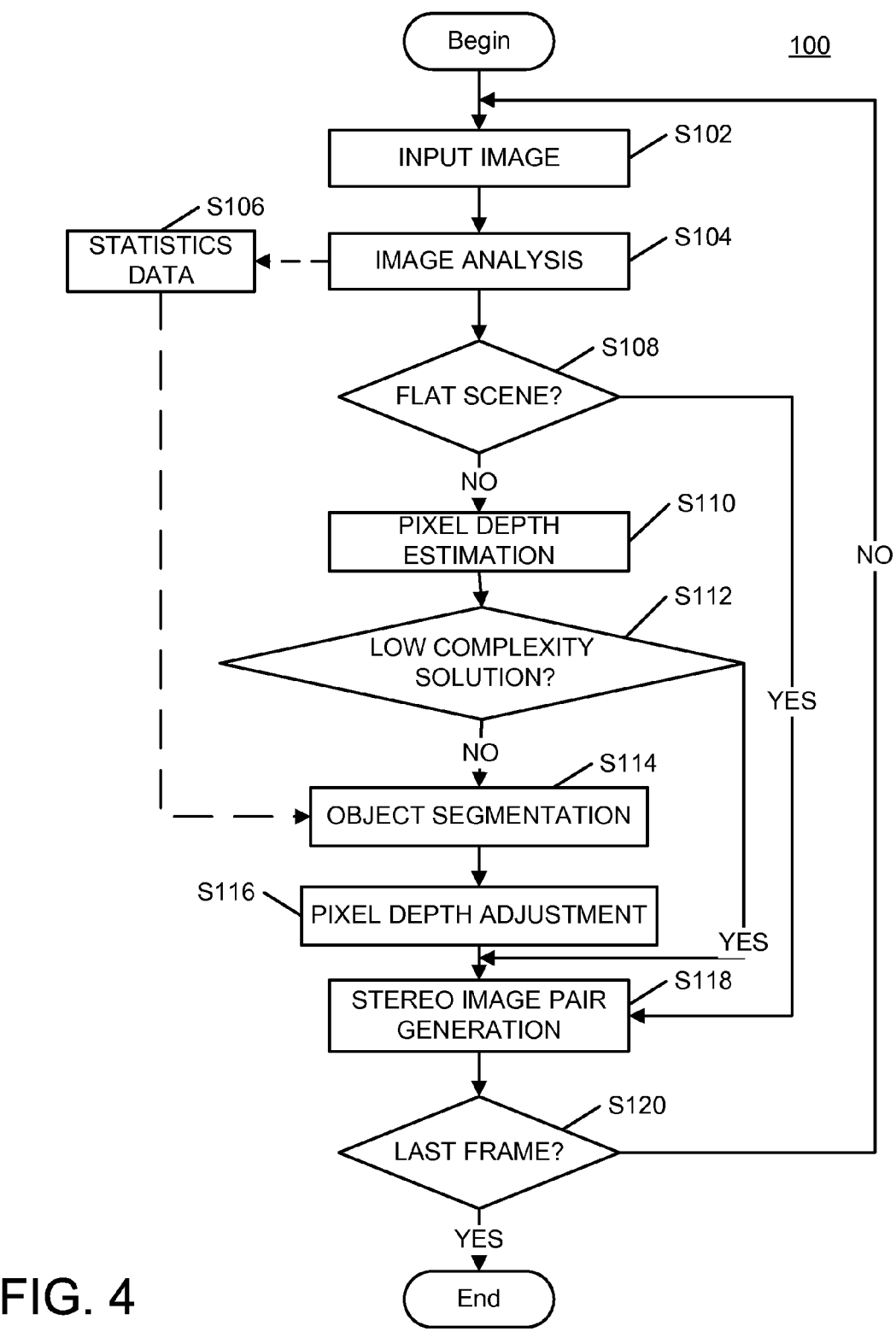
FIG. 4 illustrates a flowchart of the complexity-adaptive and automatic 2D-to-3D image and video conversion method.

Referring now to FIG. 4, the operation of the 2D-to-3D video sequence converter 30 will now be described. Such operation is referred to as a complexity-adaptive and automatic 2D-to-3D image and video conversion method, generally designated at 100. For descriptive purposes, it is assumed that the images for processing have a YUV or RGB format, and the outputs are left and right views.

The complexity-adaptive and automatic 2D-to-3D image and video conversion method 100 analyzes an input image at step S102, the input image being captured by the 2D image capturing unit 14. Alternately, the input image may be from an old or previously recorded 2D movie. Step S102 is followed by step S104 where image analysis takes place to classify the input image into a flat or non-flat frame (scene) with a set of heuristic logics. In the method 100, only the non-flat frames (scenes) are further segmented and processed based on their complexity. Accordingly, step S104 is followed by step S108 where a determination is made whether the input image is a flat scene by the flat image detector 44A. The operations of the flat image detector 44A will be described in detail in relation to FIG. 5. If the determination is "YES" (meaning the scene is a flat scene) at step S108, the step S108 is followed by step S118. For a flat image, the resultant left view and right view would be identical as the original image. Therefore no further processing, such as depth estimation/segmentation, is needed. By default, the stereo image pair generation step S118 would use the original image from step S108 for both left and right views.

However, if the determination at step S108 is "NO," (meaning the scene is a non-flat scene) then step S108 is followed by step S110 so that further segmentation and processing can ensue. In general, the depth information of a frame is estimated by object segmentation and the depth is adjusted by a number of pre-defined rules extracted from observations. To enhance the complexity adaptation, the process for generating the associated depth map can be simplified by removing segmentation operations for low-complexity applications. Thereby, at step S110 pixel depth estimation takes place. Step S110 is followed by step S112 where computational resources availability and computational complexity requirements are determined or evaluated so that the method 100 and apparatus 10 can smartly select the appropriate complexity solution (e.g. low complexity solution, medium complexity solution and high complexity solution) Thus, based on this evaluation a determination is made whether a low complexity solution is required or if the processing is being done in real-time. If the determination at step S112 is "NO," then complexity adaptations with segmentation operations (FIG. 8) takes place at step S114. Otherwise, if the determination at step S112 is "YES," then object segmentation by the object segmenter 48A is bypassed and step S112 is followed by step S118. At step S118 the stereo image pair generation takes place by the stereo image pair generator module 50.

Returning now to Step S114, during the image analysis at step S104 statistics data is generated at step S106. Such statistics data is used by the object segmenter 48A for carrying out the object segmentation of step SI14. Step S114 is followed by step S116 where pixel depth adjustments take place, as described in more detail in relation to FIG. 8. Step S116 is also followed to step S118 where the stereo image pair generation takes place, as described in more detail in relation to FIG. 9. Step S118 is followed by step S120 where a determination is made whether there are any further frames. If the frame is not the last frame, step S120 returns to step S102. Otherwise, the method 100 ends when the last frame is reached.

When an image is input at step S102 and analyzed at step S104, a color-based image analysis is used by the flat image detector 44A to detect if the input image represents a flat scene. If the input image is a flat scene, then both (left and right) views would be identical and thus the original image can be used for the (right) view at step S118.

If the image is a non-flat scene, a rule-based image pixel depth estimation process at step S110 is used to assign approximated depth for each pixel in the input image. If there are no low-complexity constraints as determined at step S112 or if the application is being done in real-time, the depths are adjusted by using object segmentation at step S114 and pixel depth adjustment at step S116 so that the pixels representing the same object can have similar depth values. If there are low-complexity constraints as determined by the complexity evaluator 44B, step S114 (object segmentation) and step S116 (pixel depth adjustment) are skipped or partially skipped to trade accuracy with speed. The term partially skipped means that some steps in the object segmentation (for example motion estimation) can be skipped for meeting the low/medium complexity requirements. The generated depth map from the image depth-map estimation sub-module 46 is processed to automatically generate the stereo image pairs representing the left and right views by the stereo image pair generator module 50.

Image Depth Estimation

The image depth estimation module 40 estimates the depth for each pixel in the image at step S110. The stereo views are generated from a monoscopic image and its associated depth map. Generally, the image depth estimation process is based on a set of rules obtained from observations. As an example, for outdoor images, the upper side has a good chance to represent the sky and the ground is normally positioned at the bottom of the image. This matches the observations that there is a tendency that the center and bottom sides of the image are nearer than the upper side in general images. The most important part is to find the relative positions between objects instead of obtaining the exact depth of the objects. The rules as mentioned above give basic guidelines for detecting the relative position between objects (for example, the upper side would be farther than center and bottom side). Once the relationship between objects is estimated (such as that which is farther than which), the depth of the objects can be estimated by using linear or non-linear interpolation in depth.

Image Classification

The image classification sub-module 42 first classifies the images into "flat image" and "non-flat image" classes (at step S108). The flat image class contains almost no depth information and thus no depth estimation is needed. Generally, there are two kinds of images that are potential flat images. The first type of flat scene images is zoomed images. In zoomed images the pixel depth differences in the image is visually negligible due to the zooming effect by the zoom module 18. The second type of flat scene images includes images corresponding to a view-from-above (or below) with 90 degree's camera elevation angle. A view-from-above image is an image captured while the user is in a plane standing or at some other location while looking down toward earth, the ground, etc. A view-from-below image is an image captured while the user is standing or at some other location and is looking up to capture the image.

Views with elevation angles less than 90 degrees contain sufficient depth information. Moreover, the depth information from these views is easier to extract than from the views with a zero degree (0°) elevation angle because the view angle increases the depth perception.

For descriptive purposes, it is assumed that the videos for processing are carefully produced by the user and thus the visual discomfort has been limited to a low probability. Therefore, it would be valid to conclude (assume) that the occurrences of upside down images, and a view-from-above (or below) with 90 degree's camera elevation angle, in the video are negligible. Accordingly, the orientation of the lens 12 is assumed to be normally aligned (aligned along a horizontal plane) with a normal perception.

Zoom-in and zoom-out operations by the zoom module 18 are commonly used in camera operations when capturing video or images by the 2D image capturing unit 14. Thus, in order to detect the flat images, the 2D-to-3D video sequence converter 30 needs to be able to automatically detect the zoomed frames. Ideally for zoom-in frames, the "blow out" motion pattern would happen in the motion estimation. In other words, the motion vectors of the macroblocks will point outward from the center of the zoom operation with a vector length proportional to the distance from the center of the zoom operation. However, the noises in the frames might cause inaccurate motion estimation and thus false detection. Furthermore, motion estimation is quite computational intensive for low-complexity applications.

In order to automatically detect the zoomed frames for classifying frames, a color-based zoomed image detection algorithm is employed. In most video sequences, the camera zoom operation follows the sequence of zoom-in-> stay ->zoom-out, or zoom-in→stay→scene change, so that the zoomed captured image can be detected by a color-histogram change.

Figure 5:
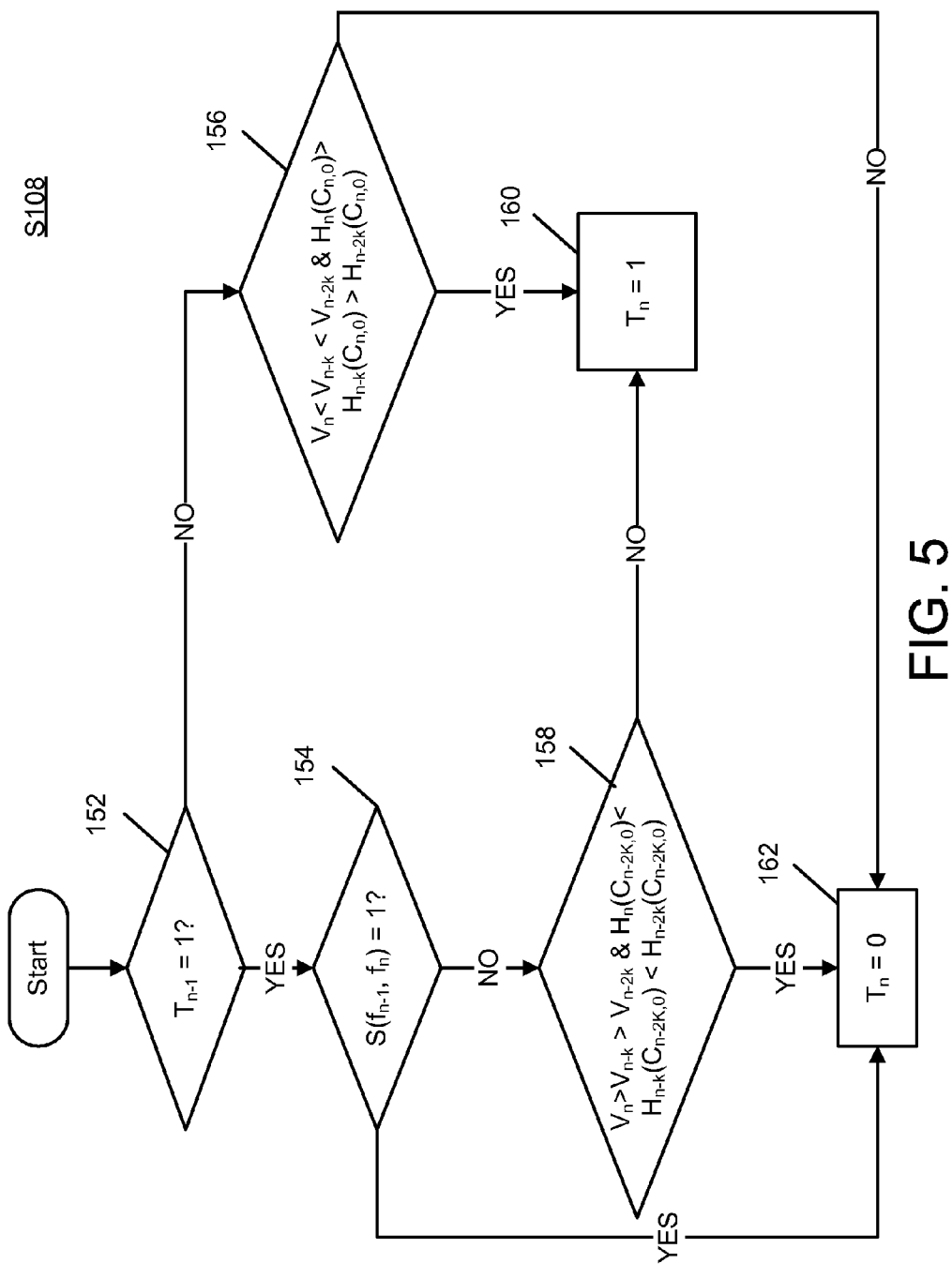
FIG. 5 illustrates a flowchart diagram of the method for classifying frames (determining a zoomed image).

FIG. 5 shows a flowchart diagram of the method for step S108 for classifying frames (determining a zoomed image). The pseudo-code corresponding to the logic shown in FIG. 5 is set forth as:

```
If T_{n-1} = 1 then // zoomed image
    If S(f_{n-1},f_n) = 1, // scene change
    then T_n = 0;
    Else // check if zoom out
        If (V_n > V_{n-k} > V_{n-2k} & H_n(C_{n-2k,0}) < H_{n-k}(C_{n-2k,0}) < H_{n-2k}(C_{n-2k,0}))
        then T_n = 0;
        else T_n = 1
else // normal image, try to find the first zoomed image
    If (V_n < V_{n-k} < V_{n-2k} & H_n(C_{n,0}) > H_{n-k}(C_{n,0}) > H_{n-2k}(C_{n,0}))
    then T_n = 1;
    else T_n = 0
```

First, n denotes the index of current frame $f_n$, $T_n$ denotes the zooming type of the current image ($T_n$=1 represents the zoomed image, otherwise $T_n$=0), $V_n$ denotes the variance of the current image, $H_n(C_{n,m})$ denotes the 32-bin color histogram and $C_{n,m}$ denotes the color with a sorted histogram (i.e., $C_n,0$ the color with the highest histogram), and $S(f_{n-1}, f_n)$ denotes the scene similarity between two frames $f_{n-1}$ and $f_n$ $S(f_{n-1}, f_n)=1$ means there is a scene change). $S(f_{n-1}, f_n)$ is defined as follows in equations Eq. (1) and Eq. (2)

$$S(f_{n-1}, f_n) = \begin{cases} 1 & \text{if } Sim[H_{n-1}(\vec{C}_{n-1}), H_n(\vec{C}_n)] \} Th \\ 0 \end{cases} \quad \text{Eq. (1)}$$

where $$Sim(\vec{x}, \vec{y}) = \frac{\vec{x} * \vec{y}}{\|\vec{x}\| * \|\vec{y}\|} \quad \text{Eq. (2)}$$

and Th is a threshold to detect the image similarity.

The method for step S108 begins with step S152 where a determination is made whether $T_{n-1}=1$ (meaning the previous frame (n−1) was a zoomed frame). If the determination at step S152 is "YES," then step S152 is followed by step S154 where another determination is made whether $S(f_{n-1},f_n)=1$ (meaning a scene change) based on equations Eq. (1) and Eq. (2) above. If the determination at step S154 is "YES," (meaning a scene change) then step S154 is followed by step S162 where $T_n$ is set equal to 0 (meaning the current frame is not a zoomed image). Thus, the current frame is a non-flat image.

If the previous frame is a zoomed image ($T_{n-1}=1$) at step S152 and the current frame is not a scene change (meaning $S(f_{n-1},f_n)\neq 1$) at step S154, the method of step S108 determines whether the zoom module 18 of the 2D image capturing unit 14 is zooming out at step S158. As an example, the zooming out state can be determined by the gradual increasing of the image variation denoted as $V_n$ and the gradual deceasing of the percentage of certain color (primary color component of previous frame) in the recent frames. Similarly, if the previous frame $f_{n-1}$ is not a zoomed image (meaning $T_{n-1}=0$), the method of step S108 also needs to detect if the camera is zooming in at step S156. Hence step S152 is followed by step S156.

It should be noted that the value k is a constant determined by the frame-rate and normal zooming speed. For a 30-frame second per video clip, k=10 could be a reasonable setting.

Returning again to step S154, if the determination is "NO," (meaning the current frame is not a scene change), then step S154 is followed by step S158 where a determination is made whether equation Eq. (3) is satisfied $$V_n > V_{n-k} > V_{n-2k} \text{ and } H_n(C_{n-2k,0}) < H_{n-k}(C_{n-2k,0}) < H_{n-2k}(C_{n-2k,0}). \quad \text{Eq. (3)}$$

If the determination at step S158 is "NO," the step S158 is followed by step S160 where $T_n$ is set equal to 1 (meaning the current frame is a zoomed image). However, if the determination at step S158 is "YES," the step S158 is followed by step S162 where $T_n$ is set equal to 0 (meaning the current frame is not a zoomed image). Thus, the current frame is a non-flat image.

If the determination at step S152 is "NO," (meaning the previous frame $f_{n-1}$ is not a zoomed image), then step S152 is followed by step S156. At step S156, a determination is made whether equation Eq. (4) is satisfied $$V_n < V_{n-k} < V_{n-2k} \text{ and } H_n(C_{n,0}) > H_{n-k}(C_{n,0}) > H_{n-2k}(C_{n,0}). \quad \text{Eq. (4)}$$

If the determination at step S156 is "YES," then step S156 is followed by step S160 where $T_n$ is set equal to 1 (meaning the current frame is a zoomed image). However, if the determination at step S156 is "NO," then step S156 is followed by step S162 where $T_n$ is set equal to 0 (meaning the current frame is not a zoomed image). Thus, the current frame is a non-flat image.

Image Depth-map Estimation

Those images determined to be flat images (at step S108) do not require depth estimation because the flat image class contains almost no depth information. Hence, the description below relates to image depth-map estimation performed at step S110 for the non-flat images. The exemplary embodiment does not recover the actual depth of the image pixels. Instead, the exemplary embodiment generates or estimates an image depth-map to enhance the 3D effect of the original image. The image depth-map estimation process of step S110 is based on two fundamental assumptions. The first assumption is that the scene is composed of a number of objects, and the pixels corresponding to the same object have closer depth values, and their differences can be negligible. The second assumption is that for most non-flat images, the depth of the objects decreases from the top to the bottom. There are some counter-examples to the assumptions, for example indoor scenes and cases when occlusion occurs. However, the detection of such scenes is extremely difficult and time-consuming, and there are no low-complexity solutions available. In general, the two assumptions, set forth above, are valid for most video clips and the counter-examples do not have significant impact on the visual effect of the generated 3D images.

Referring still to FIG. 4, the image depth-map estimation process of step S110 initially assigns each pixel a depth value which is proportional to its vertical coordinate value. Thereafter, the depth map is adjusted based on the results of object segmentation at step S114 shown in FIG. 7. With specific reference to FIGS. 6 and 7, to reduce the computational complexity, only a portion of the image is selected for segmentation when necessary. However, if a low complexity solution is required at step S112, the object segmentation and pixel depth adjustment steps S114 and 116 can be skipped.

Figure 6:
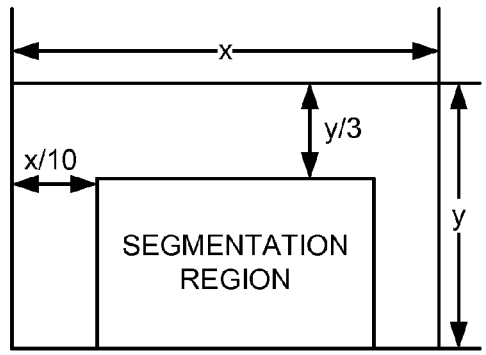
FIG. 6 illustrates a selected segmentation region under evaluation.
Figure 7:
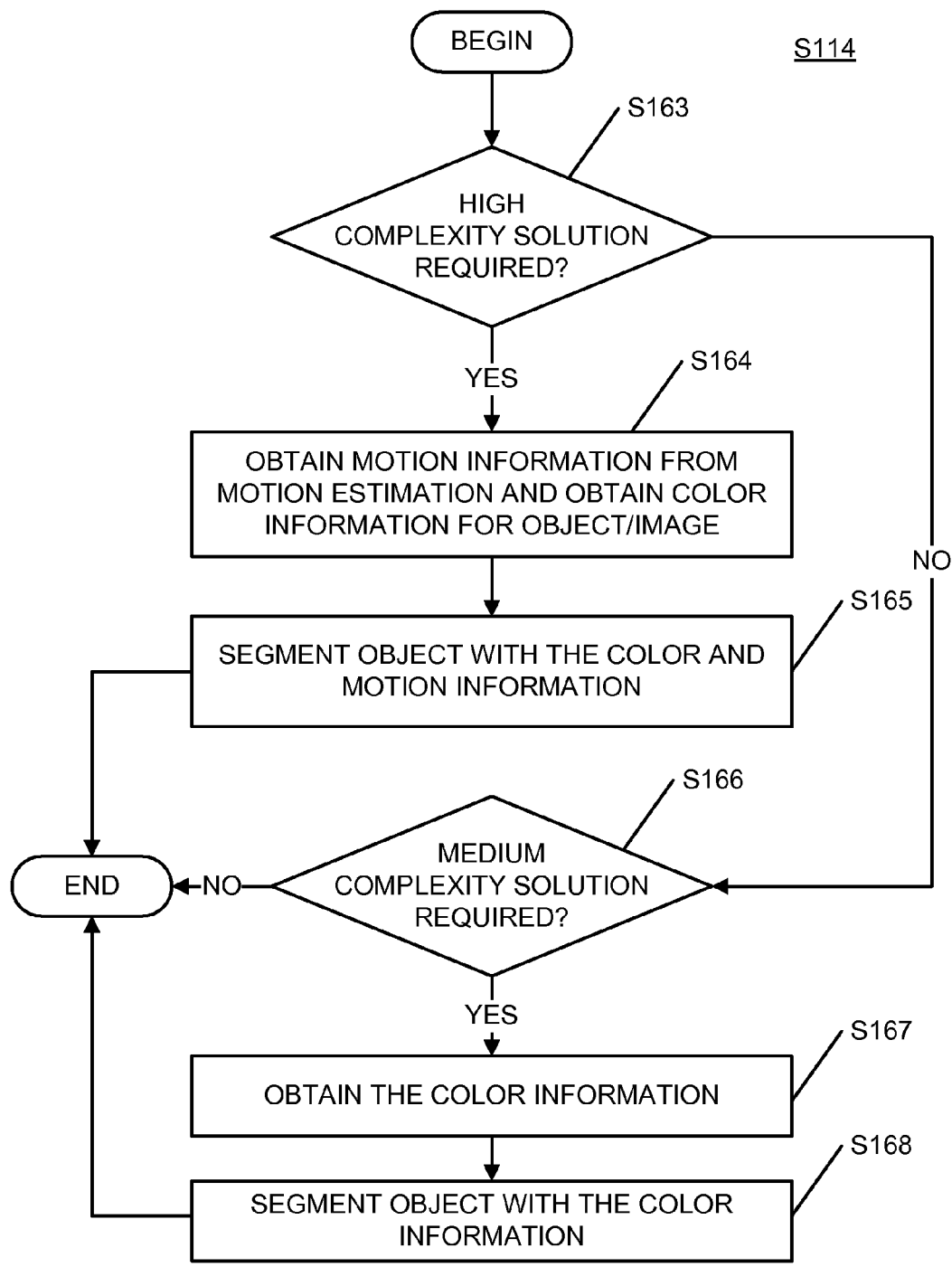
FIG. 7 illustrates a flowchart of the complexity adaptive process for object segmentation.

Because the center and bottom regions normally correspond to a closer object which are more visually sensitive, these regions are chosen as the region for segmentation, as best seen in FIG. 6. The segmentation region is selected as a bottom centered portion of the original image. In the exemplary embodiment, the top edge of the bottom centered portion is ⅓ below the top edge of the original image or ⅔ of the vertical height (y) of the original image. The bottom edge of the segmentation region is aligned with the bottom edge of the original image. However, the left and right edges of the segmentation region begin at a distance which is 1/10 of the horizontal length (x) from the left edge and 1/10 of the horizontal length (x) from the right edge. In the segmentation region, the object segmentation is conducted to separate the region into a number of sub-regions (or objects). Nevertheless, other proportions other than ⅓ the vertical height (y) and 1/10 of the horizontal length (x) may be substituted for the segmentation region.

Referring again to FIG. 7, the complexity-adaptive feature also uses a higher complexity solution when required by the object segmenter 48A. Thus, step S114 begins with step S163 where a determination is made whether there is a high complexity solution required based on the computational resources and computational complexity requirements. If the determination is "YES," step S163 is followed by step S164 where, for example, motion information from motion estimation is obtained as well as color information when the high complexity solution is employed. Step S164 is followed by step S165 where the object is segmented using, for example, the color and motion information.

However, if the determination at step S163 is "NO," then step S163 is followed by step S166 where a determination is made whether there is a medium complexity solution required. If the determination at step S166 is "YES," (meaning a medium complexity procedure for object segmentation is employed) then step S166 is followed by step S167. At step S167, the medium complexity procedure employs only color information. Nevertheless other medium complexity procedures may be substituted. Step S167 is followed by step S168 where the object is segmented with the color information using the medium complexity procedure. Steps S165 and S168 terminate the process for step S114. Furthermore, if the determination at step S166 is "NO," the process of step S114 is also terminated.

As can be appreciated, the arrangement of the determination steps S163 and S166 can be shifted depending on whether the medium complexity solution has a higher priority. Generally, the high complexity solution would be more accurate. The motion estimation and color information could be a part of the object segmentation step S114, or could be a part of the statistics data at step S106 provided by the image analysis step S104. Normally the motion estimation process is quite time-consuming. Thus, the motion estimation process would not necessarily be performed at step S104, and would be conducted in step S114 depending on the complexity requirements. However, if it is available for some applications, then the object segmentation (step S114) can save the efforts.

When a medium complexity solution is required, color information is only used for segmentation. For real-time applications or when a low complexity solution is required, the segmentation operations are skipped to avoid taxing computations. It is also assumed that there is a feedback channel from the processor 24 to inform the program code of the current status (e.g. resource allocation and CPU usage) of the 3D stereoscopic imaging apparatus 10. The processor 24 can choose the solution adaptively based on the image complexity. The complexity requirement is basically adjusted by the application-level software, for example, in a mobile phone. The software controlling the power consumption would dynamically allocate computing power to each running task, which directly affects the computational complexity requirements.

Figure 8:
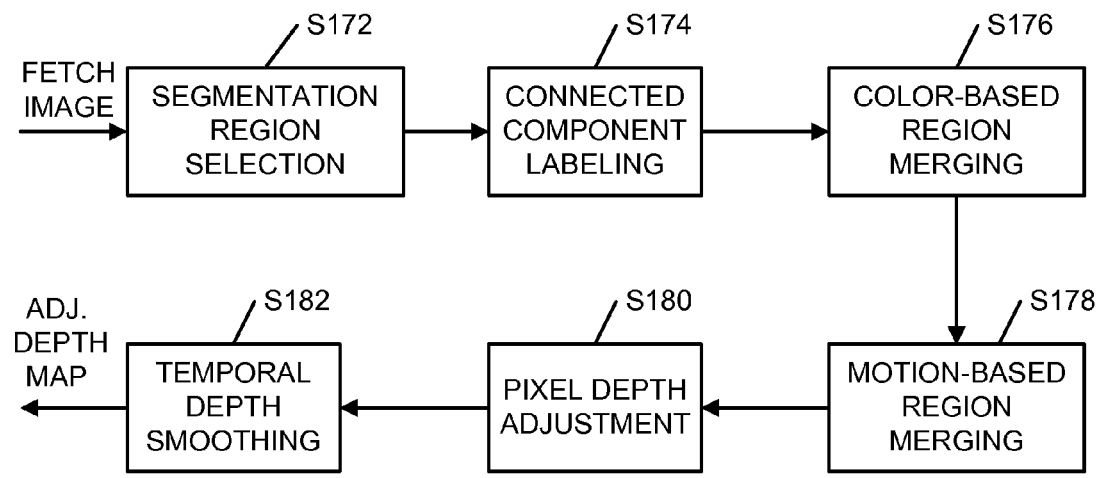
FIG. 8 illustrates a block diagram of a complexity adaptive segmentation and image depth-map adjustment process.

In FIG. 8, the complexity-adaptive process of both the object segmentation and depth-map (pixel depth) adjustment is shown. The process is generally for both steps S114 and S116 and begins with step S172 where the segmentation region (FIG. 6) is selected in a fetched image. Step S172 is followed by step S174 where a connected component labeling approach is used to divide the image into a number of small connected regions where the pixels inside the same region have similar color intensity. Step S174 is followed by step S176 where a color-based region merging algorithm is used to merge these small regions into bigger regions, if any neighbor sub-regions have close mean color intensity. Step S176 is followed by step S178 where motion information (if available) is used further to merge regions moving in the similar direction into bigger objects via a motion-based region merging algorithm.

Steps S172, S174, S176 and S178 are segmentation steps. The steps S176 and S178 can be used selectively, and step S178 is only used for a high-complexity solution. After the segmentation steps are completed, step S178 is followed by step SI 80 where the pixel depth is adjusted for each object and the depth of each pixel inside an object is assigned the minimum depth of the pixels in the object. Finally, step S180 is followed by step S182 where a temporal depth smoothing process is used to avoid sharp depth change between adjacent frames. The motivation for the temporal depth smoothing process is that, in general, the frame rate of video clips is high enough so that the objects in the scene do not move very fast in depth except for some occlusion cases. Denoting by dn−1 (i,j) and dn(i,j) the depth of pixel (i,j) in the (n−1)st and nth frame, the dn(i,j) is adjusted according to equation Eq. (5) as follows, $$d_n(i, j) = \begin{cases} d_n(i, j) & \text{if } 0.7 < \dfrac{d_n(i, j)}{d_{n-1}(i, j)} < 1.5 \\ \dfrac{2d_n(i, j) + d_{n-1}(i, j)}{3} & \text{otherwise} \end{cases} \quad \text{Eq. (5)}$$

An estimated depth map corresponding to the original image has lighter areas which correspond to the farer objects, and darker areas corresponding to the closer objects. In the exemplary embodiment, the image depth-map estimation process with adjustment shown in FIG. 8 is capable of classifying farther objects from closer objects, although some misclassified objects exist due to the lack of semantic information for better segmentation.

Figure 9:
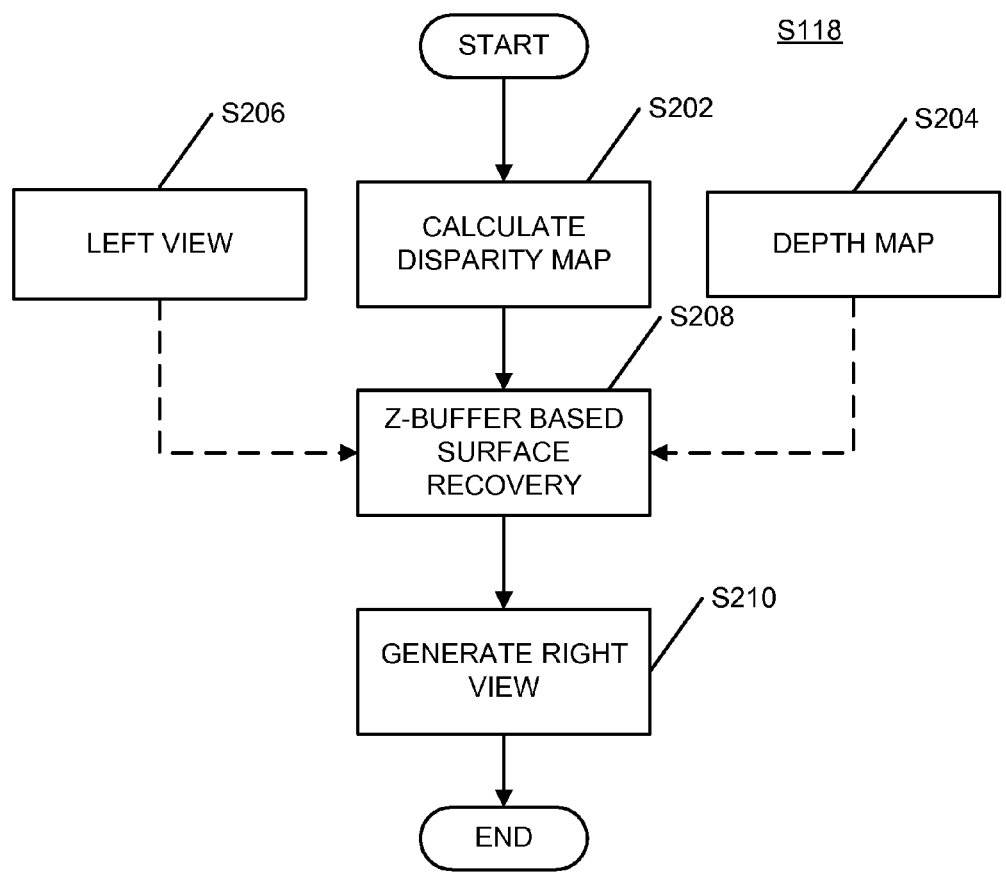
FIG. 9 illustrates a flowchart of the stereo image pair generation process.

Referring now to FIGS. 1, 3 and 9, the apparatus 10 thus far has captured an image or left view and obtained a corresponding image depth map at the output of the image depth-map estimation sub-module 46. The stereo image pair generation module 50 uses an image pair generation process at step S118 which will now be described. At step S206 the left view is obtained and its corresponding image depth map at step S204 is obtained.

While the image pair generation process of step S118 first assumes the obtained or captured image is the left view at step S206 of the 3D stereoscopic imaging apparatus 10, alternately, the obtained or captured image could be considered the right view. Then, based on the image depth map obtained at step S204 (the output of the image depth estimation module 40), a disparity map (the distance in pixels between the image points in both views) for the image is calculated at step S202 in the disparity map sub-module 52. The disparity map calculations by the disparity map sub-module 52 will be described below with reference to FIGS. 11A and 11B. Both the left view and the depth map are also input for calculating the disparity map, however, for the 3D view generation, the left view of step S206 and the depth map of step S204 directly contribute to the Z-buffer based surface recovery process. Step S202 is followed by step S208 where a Z-buffer based 3D interpolation process by the Z-buffer 3D surface recover sub-module 54 is called to construct a 3D visible surface for the scene from the right eye. Step S208 is followed by step S210 where the right view is obtained by projecting the 3D surface onto a projection plane, as best seen in FIG. 10B.

In FIG. 10A, the geometry model of binocular vision is shown using the Left (L) and Right (R) views on a projection plane for a distant object. In FIG. 10B, F is the focal length, $L(x_L, y_L, 0)$ is the left eye, $R(x_R, y_R, 0)$ is the right eye, $T(x_T, y_T, Z)$ is a 3D point in the scene, and $P(x_P, y_P, F)$ and $Q(x_Q, y_Q, F)$ are the projection points of the T onto the left and right projection planes. Clearly, the horizontal positions of P and Q on the projection planes are $(x_P - x_L)$ and $(x_Q - x_R)$, and thus the disparity is $d = [(x_Q - x_R) - (x_P - x_L)]$.

As shown in FIG. 10B, the ratio of F and z is defined in equation Eq. (6) as $$\frac{F}{z} = \frac{x_P - x_L}{x_T - x_L} = \frac{x_Q - x_R}{x_T - x_R} \quad \text{Eq. (6)}$$

where z is the depth so equations Eq. (7) and Eq. (8) follow as $$x_P - x_L = \frac{F}{z}(x_T - x_L), \quad \text{Eq. (7)}$$

$$x_Q - x_R = \frac{F}{z}(x_T - x_R), \quad \text{Eq. (8)}$$

and thus the disparity d can be obtained by equation Eq. (9)

$$d = \frac{F}{z}(x_L - x_R). \quad \text{Eq. (9)}$$

Therefore, for every pixel in the left view, its counterpart in the right view is shifted to the left or right side by a distance of the disparity value obtained in Eq. (9). However, the mapping from left-view to right-view is not 1-to-1 mapping due to possible occlusions, therefore further processing is needed to obtain the right-view image.

Therefore, a Z-buffer based 3D interpolation process of step S210 is performed by the Z-buffer 3D surface recover sub-module 54 for the right-view generation. The distance between two eyes compared to the distance from the eyes to the objects (as shown in FIG. 10A) is very small. Thus, it is assumed that the distance from object to the left eye is approximately equal to the distance from itself to the right eye, which would greatly simplify the calculation. Therefore, a depth map Z(x,y) (where Z(x,y) is actually an image depth map, but it is an unknown map to be detected) is maintained for the Right (R) view where x,y are pixel positions in the view.

Figure 11A:
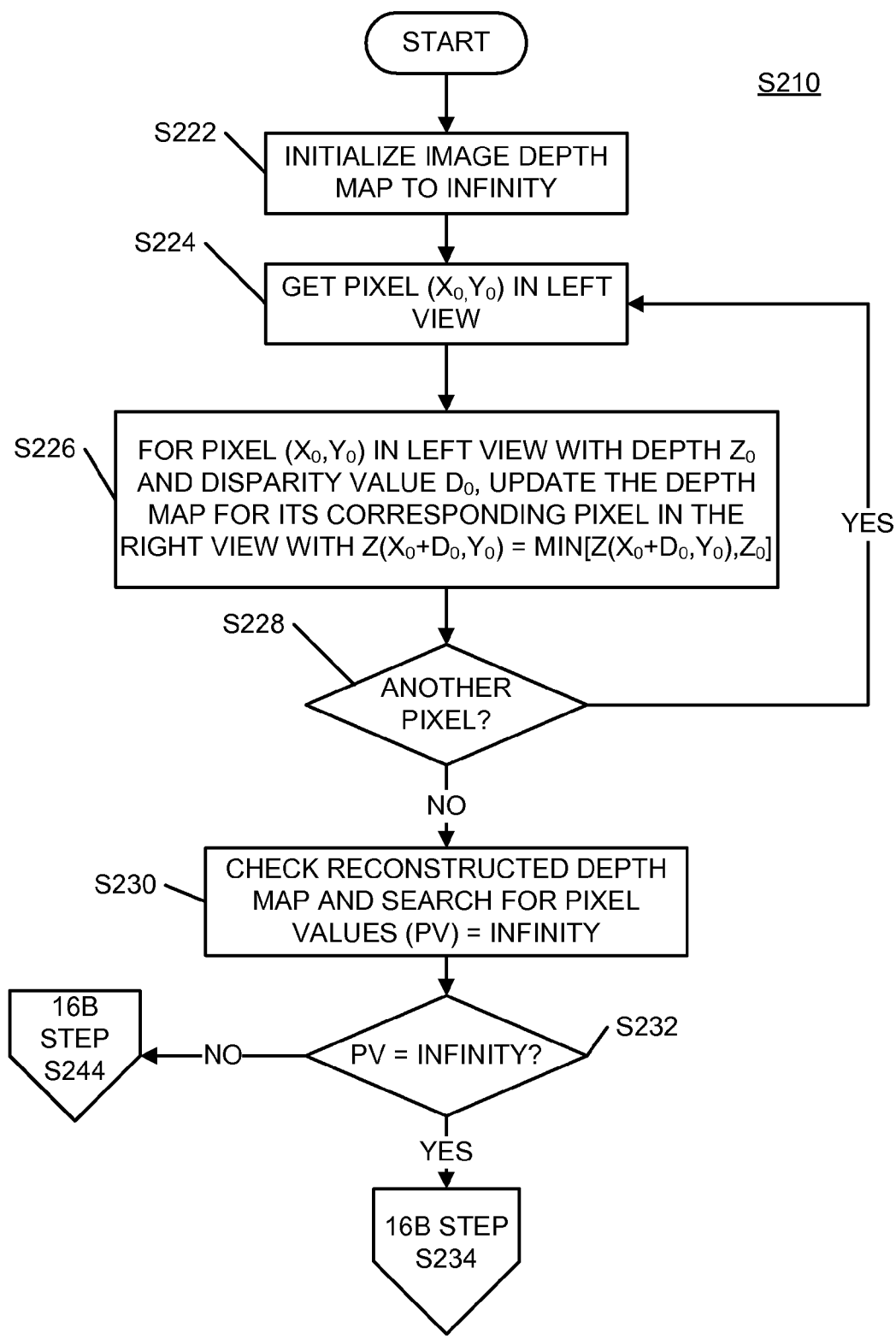
FIGS. 11A-11B illustrate a flowchart of a Z-buffer based 3D interpolation process.
Figure 11B:
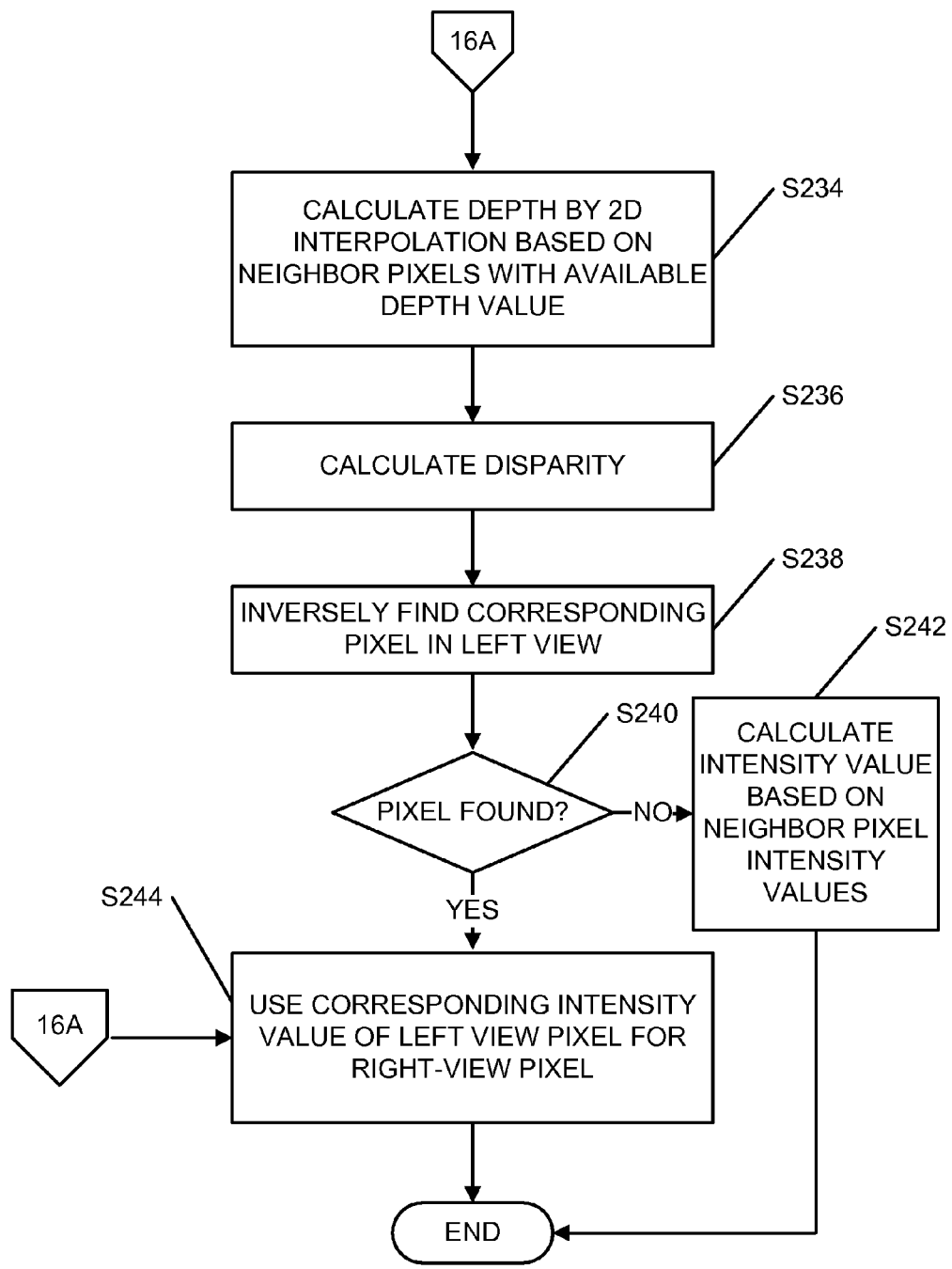

Referring now to FIGS. 11A and 11B, the process of step S210 to reconstruct the 3D visible surface for the right-view will now be described. At the beginning (step S222), the depth map is initialized as infinity. Step S222 is followed by step S224 where a pixel $(x_0, y_0)$ in the left view is obtained. Then, for every pixel $(x_0, y_0)$ in the left view with depth $z_0$ and disparity value do, the depth map is updated for its corresponding pixel in the right view in step S226 by equation Eq. (10) defined as $$Z(x_0+d_0, y_0) = \min[Z(x_0+d_0, y_0), z_0] \quad \text{Eq. (10)}$$

Step S226 is followed by step S228, which is a determination step to determine whether there are any more pixels. If the determination is "YES," step S228 returns to step S224 to get the next pixel. However, after all the pixels in the left-view are processed (thus the determination at step S228 is "NO,"), then step S228 is followed by step S230 where the reconstructed depth map is checked and searched for the pixels with values equal to infinity (the pixels without a valid map on the left-view). Step S230 is followed by step S232 where a determination is made whether a pixel value (PV) is equal to infinity. If the determination at step S232 is "NO," than the pixel value (PV) is valid and can be used directly as the intensity value at step S244 of FIG. 10B.

If the determination at step S232 is "YES" for such pixels, step S234 follows which first calculates the depth for the corresponding pixel by 2D interpolation based on its neighbor pixels with available depth values. Step S234 is followed by step S236 where the disparity value is computed using Eq. (9) above. Step S236 is followed by step S238 where the process inversely finds the corresponding pixel in the left view. Step S238 is followed by step S240 to determine if a pixel is found. If the corresponding pixel is available, step S240 is followed by step S244 where the corresponding intensity value can be used on the right-view pixel. Otherwise, if the determination at step S240 is "NO," step S240 is followed by step S242 which uses interpolation to calculate the intensity value based on its neighbor pixels in the right-view with available intensity values.

The benefits of using the proposed algorithm over the direct intensity interpolation method is that it considers the 3D continuity of the object shape which results in better realism for stereo effect. The problem of recovering an invisible area of a left view is an ill-posed problem. In one known solution, the depth of a missing pixel is recovered by using its neighbor pixel in a horizontal direction corresponding to further surface with an assumption that no other visible surfaces behind is in the scene. For some cases, the assumption might be invalid. To consider more possible cases, in the proposed solution, the surface recovering considers depths of all neighbor pixels in all directions, which will reduce the chances of invalid assumption and will result in better 3D continuity of the recovered surface.

Experimental Results

The method 100 was tested on a number of video clips. An inexpensive red-blue anaglyph was used to demonstrate the resulting 3D effect, although the generated stereo views are feasible to be displayed by mechanisms such as holographic and stereoscopic devices. The anaglyph result illustrates, in general, a translucent shadow or a ghost of the objects in the original image immediately adjacent to the objects in the original image. The red-blue anaglyph colors the translucent shadow or ghost with a blue and/or red color. With a pair of red-blue 3D glasses, the significantly enhanced 3D effect can be observed. The experimental results have indicated that the 3D effects of the converted video are quite evident.

As can be seen, the apparatus 10 and method 100 provide 2D-to-3D image and/or video conversion which is complexity-adaptive and automatic. Furthermore, the apparatus 10 and method 100 provide 2D-to-3D image and/or video conversion which is generic for both real-time and offline 2D-to-3D video conversion and which can be used to enhance the 3D effect of some previous recorded 2D movies.

It should be noted that other issues such as the bitstream format of the input images (i.e., compressed or raw data) and the display methods for the output video are not within the scope described herein.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of processing video data in an electronic device, the method comprising:

analyzing a 2D input;

classifying a frame of the 2D input into a class selected from a flat image class and a non-flat image class based in part on depth information of the frame;

processing automatically and adaptively, based on computational complexity, those frames classified as the non-flat image class to create a depth map estimate; and converting into a 3D stereo image those frames classified as the flat image class and, after the processing step, those frames classified as the non-flat image class.

2. The method of claim 1, wherein the processing step comprises estimating the depth map estimate, determining whether a current application requires a low complexity solution for the frame classified as the non-flat image class, and when the low complexity solution is required, converting those frames classified as the non-flat image class using the depth map estimate.

3. The method of claim 2, wherein the processing step further comprises object segmenting the frame classified as the non-flat image class into a number of segmented regions, and adjusting a pixel depth of the segmented regions.

4. The method of claim 3, wherein the processing step further comprises determining computational resources available and computational complexity requirements, and selecting the low complexity solution, a medium complexity solution or a high complexity solution to meet the computational complexity requirements; wherein if the high complexity solution or the medium complexity solution is required, the object segmenting step uses color information; and wherein if the high complexity solution is required, color information and motion estimation information are used for the segmenting step.

5. The method of claim 3, wherein the processing step further comprises processing the segmentation region with a connected component labeling process to form a first output, processing the first output with a color-based region merging process to form a second output, processing the second output with a motion-based region merging process to form a third output, adjusting a pixel depth of the third output to form a fourth output, and temporal depth smoothing the fourth output.

6. The method of claim 1, wherein the classifying step comprises determining whether the frame is for a zoomed scene; and wherein if the frame is for a zoomed scene, the frame is classified as the flat image class, and if the frame is not for a zoomed scene, the frame is classified as the non-flat image class.

7. The method of claim 1, wherein the 2D input comprises one of an offline 2D image, a monoscopic image, and a previously recorded 2D movie.

8. The method of claim 1, wherein the converting step comprises assigning the frame classified as the flat image class as both a left view and a right view.

9. The method of claim 1, wherein the converting step comprises using the frame classified as the non-flat image class as a left view, calculating a disparity map based on a distance in pixels between image points in left and right views of binocular vision geometry for the left view of the frame classified as the non-flat image class, constructing a 3D visible surface from a missing right viewpoint to form a constructed 3D surface, and generating stereo views by projecting the constructed 3D surface onto a projection plane.

10. An apparatus comprising:

analyzing means for analyzing a two-dimensional (2D) input;

classifying means for classifying a frame of the 2D input into a class selected from a flat image class and a non-flat image class based in part on depth information for the frame;

processing means for processing automatically and adaptively, based on computational complexity, those frames classified as the non-flat image class to create a depth map estimate; and converting means for converting into a 3D stereo image those frames classified as the flat image class and, using the depth map estimate, those frames classified as the non-flat image class.

11. The apparatus of claim 10, wherein the processing means comprises: estimating means for estimating the depth map estimate and determining means for determining whether a current application requires a low complexity solution for the frame classified as the non-flat image class; wherein when the low complexity solution is required, the converting means converts those frames classified as the non-flat image class using the depth map estimate.

12. The apparatus of claim 11, wherein the processing means further comprises: segmenting means for object segmenting the frame classified as the non-flat image class into a number of segmented regions when the low complexity solution is not required; and adjusting means for adjusting a pixel depth of the segmented regions.

13. The apparatus of claim 12, wherein the processing means further comprises: determining means for determining whether a high complexity solution or a medium complexity solution is required by the current application for processing the frame classified as the non-flat image class; wherein the segmenting means uses only color information when the medium complexity solution is required; and wherein the segmenting means uses motion estimation information and color information when the high complexity solution is required.

14. The apparatus of claim 13, wherein the processing means further comprises: connected component labeling means for labeling the segmentation region to form a first output; color-based region merging means for merging the first output to form a second output; motion-based region merging means for merging the second output to form a third output; pixel depth adjusting means for adjusting a pixel depth of the third output to form a fourth output; and temporal depth smoothing means for temporal depth smoothing the fourth output.

15. The apparatus of claim 10, wherein the classifying means comprises determining means for determining whether the frame is for a zoomed scene, classifying the frame as the flat image class if the frame is for a zoomed scene, and classifying the frame as the non-flat image class if the frame is not for a zoomed scene.

16. The apparatus of claim 10, wherein the 2D input is a real-time 2D image comprising one of an offline 2D image, a monoscopic image, and a previously recorded 2D movie.

17. The apparatus of claim 10, wherein the converting means comprises assigning mean for assigning the frame classified as the flat image class as both a left view and a right view.

18. The apparatus of claim 10, wherein the converting means comprises:

means for using the frame classified as the non-flat image class as a left view; calculating means for calculating a disparity map based on a distance in pixels between image points in left and right views of binocular vision geometry for the left view of the frame; constructing means for constructing a 3D visible surface from a missing right viewpoint to form a constructed 3D surface; and generating means for generating stereo views by projecting the constructed 3D surface onto a projection plane.

19. A computer program product including a non-transitory computer readable medium having instructions for causing a computer to:
analyze a two-dimensional (2D) input;
classify a frame of the 2D input into a class selected from a flat image class and a non-flat image class based in part on depth information for the frame;
process automatically and adaptively, based on computational complexity, those frames classified as the non-flat image class to create a depth map estimate; and
convert into a 3D stereo image those frames classified as the flat image class and, after the processing step, those frames classified as the non-flat image class.

20. An apparatus comprising:
an image classification module operable to classify a frame of a two-dimensional (2D) input into a first image class or a second image class based in part on depth information for the frame;
an image depth-map estimation module operable to process automatically and adaptively, based on computational complexity, those frames classified as the second image class to create a depth map estimate; and
a 3D image pair generator module operable to convert into a 3D stereo image those frames classified as the first image class and, using the depth map estimate, those frames classified as the second image class.

21. The apparatus of claim 20, wherein the first image class includes a flat image and the second image class includes non-flat image class.

22. The apparatus of claim 21, wherein the image depth-map estimation module is further operable to estimate the depth map estimate, determine whether a low complexity solution is required for a current application, and convert those frames classified as the second image class using the depth map estimate if the low complexity solution is required.

23. The apparatus of claim 22, wherein the image depth-map estimation module is further operable to object segment the frame classified as the second image class into a number of segmented regions when a low complexity solution is not required, and to adjust a pixel depth of the segmented regions.

24. The apparatus of claim 23, wherein the image depth-map estimation module is further operable to determine whether a high complexity solution or a medium complexity solution is required by the current application to process the frame classified as the second image class; wherein the second image class is segmented using only color information when the medium complexity solution is required; and wherein motion estimation information and color information are used when the high complexity solution is required.

25. The apparatus of claim 23, wherein the image depth-map estimation module is further operable to connected component label the segmentation region to form a first output, to color-based region merge the first output to form a second output, to motion-based region merge the second output to form a third output, to adjust a pixel depth of the third output to form a fourth output, and to temporal depth smooth the fourth output.

26. The apparatus of claim 21, wherein the image classification module is further operable to determine whether the frame is for a zoomed scene, classify the frame as the flat image if the frame is for a zoomed scene, and classify the frame as the non-flat image if the frame is not for a zoomed scene.

27. The apparatus of claim 20, wherein the 2D input is a real-time 2D image comprising one of an offline 2D image, a monoscopic image, and a previously recorded 2D movie.

28. The apparatus of claim 20, wherein the 3D image pair generator module is further operable to assign the frame classified as the first image class as both a left view and a right view.

29. The apparatus of claim 20, wherein the 3D image pair generator module is further operable to use the frame classified as the second image class as a left view, calculate a disparity map based on a distance in pixels between image points in left and right views of binocular vision geometry for the left view of the frame, construct a 3D visible surface from a missing right viewpoint to form a constructed 3D surface, and generate stereo views by projecting the constructed 3D surface onto a projection plane.

30. The apparatus of claim 20, wherein the apparatus includes one of a mobile, cellular or satellite telephone with video capability, a monoscopic camera, a video device, a laptop, a Tablet PC, or other computing device with video capability.

* * * * *